(12) United States Patent
Koskinen et al.

(10) Patent No.: US 11,308,193 B2
(45) Date of Patent: Apr. 19, 2022

(54) SYSTEM AND METHOD FOR TRANSLATING CUSTOM ENTITLEMENTS

(71) Applicant: JPMorgan Chase Bank, N.A., New York, NY (US)

(72) Inventors: Brooke Koskinen, Dublin, OH (US); Imamuddin H. Syed, Hyderabad (IN); William Loughery, Garnet Valley, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 301 days.

(21) Appl. No.: 16/557,051

(22) Filed: Aug. 30, 2019

(65) Prior Publication Data

US 2021/0064731 A1 Mar. 4, 2021

(51) Int. Cl.
*G06F 21/41* (2013.01)

(52) U.S. Cl.
CPC .................................. *G06F 21/41* (2013.01)

(58) Field of Classification Search
CPC . G06F 21/41; G06F 2221/2141; G06F 21/335
See application file for complete search history.

(56) References Cited

U.S. PATENT DOCUMENTS

| | | | |
|---|---|---|---|
| 2010/0030805 A1* | 2/2010 | Hinton | H04L 63/0815 713/157 |
| 2014/0122568 A1* | 5/2014 | Nair | H04L 61/1523 709/203 |
| 2016/0012243 A1* | 1/2016 | Fielder | H04L 9/0894 713/165 |
| 2019/0028461 A1* | 1/2019 | Ishikawa | H04L 63/0815 |
| 2019/0245873 A1* | 8/2019 | Wu | H04L 63/1408 |
| 2020/0007530 A1* | 1/2020 | Mohamad Abdul | H04L 67/26 |
| 2021/0034748 A1* | 2/2021 | Ahmed | G06F 21/575 |

* cited by examiner

*Primary Examiner* — Beemnet W Dada
(74) *Attorney, Agent, or Firm* — Hunton Andrews Kurth LLP

(57) ABSTRACT

An embodiment of the present invention is directed to a translation layer that intercepts a token and converts new group names into old entitlement verbiage based on data loaded at start-up (e.g., hash map, etc.) from a configuration file. The old entitlement verbiage may be loaded into the User Session just as it would have been if the entitlements had come from within the old application authorization structure. The remainder of the application is unaware that the authorization source has changed.

18 Claims, 3 Drawing Sheets

SYSTEM AND METHOD FOR TRANSLATING CUSTOM ENTITLEMENTS

FIELD OF THE INVENTION

The invention relates generally to a system and method for implementing a translation layer to intercept a token and translate custom entitlements.

BACKGROUND OF THE INVENTION

Custom entitlements generally represent application capabilities and security permissions granted to applications for a particular user. Custom entitlements specify what a particular user is allowed to do within a particular application. When a user logs in, the application may access a corresponding database to determine what access the user is allowed to have and then grant corresponding access to various portions of the application based on the user's entitlement.

Cyber projects are mandating that the custom entitlement applications migrate to Active Directory Federation Services (ADFS) tokens for authorization whenever technically feasible. Most applications are achieving this by removing the references to old entitlements, resulting in exponentially growing development hours based on the number of entitlements being replaced. Thousands of hours in development per application are being spent on the endeavor. A significant amount of those hours are spent redesigning entitlement structures, determining how to integrate with the internal ADFS services and propagating the new entitlement group names throughout the application. User interface functionality would then need to be retested to ensure the applications were behaving as expected. With hundreds of applications expected to complete the exercise, the current migration process is labor intensive and time consuming.

These and other drawbacks exist.

SUMMARY OF THE INVENTION

According to one embodiment, the invention relates to a system that implements a translation layer that converts source groups into custom entitlements known by the application. The system comprises: an input that receives an inbound single sign-on token wherein the single sign-on token references one or more groups; and a library component that translates the one or more groups to a corresponding entitlement based on injected mappings loaded at start-up; stores the corresponding entitlements in a User Session; and enables the application to access the corresponding entitlements; wherein the library component and the injected mappings are supported by a user interface that executes the application.

According to another embodiment, the invention relates to a method that implements a translation layer that converts source groups into custom entitlements known by the application. The method comprises the steps of: receiving, via an input, an inbound single sign-on token wherein the single sign-on token references one or more groups; translating, via a library component, the one or more groups to a corresponding entitlement based on injected mappings loaded at start-up; storing the corresponding entitlements in a User Session; and enabling the application to access the corresponding entitlements; wherein the library component and the injected mappings are supported by a user interface that executes the application.

The system may include a specially programmed computer system comprising one or more computer processors, interactive interfaces, electronic storage devices, and networks. The computer implemented system, method and medium described herein provide unique advantages to entities, organizations and other users, according to various embodiments of the invention. An embodiment of the present invention is directed to implementing a translation layer that intercepts a token and converts an associated group into a language that the application is familiar with. An embodiment of the present invention realizes simplification of efforts and substantial reduction in hours required to migrate. Translation layer removes complexity, reduces error and enables someone with little or no knowledge of the application to complete the migration. In addition, the ADFS layer reduces time to market substantially.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
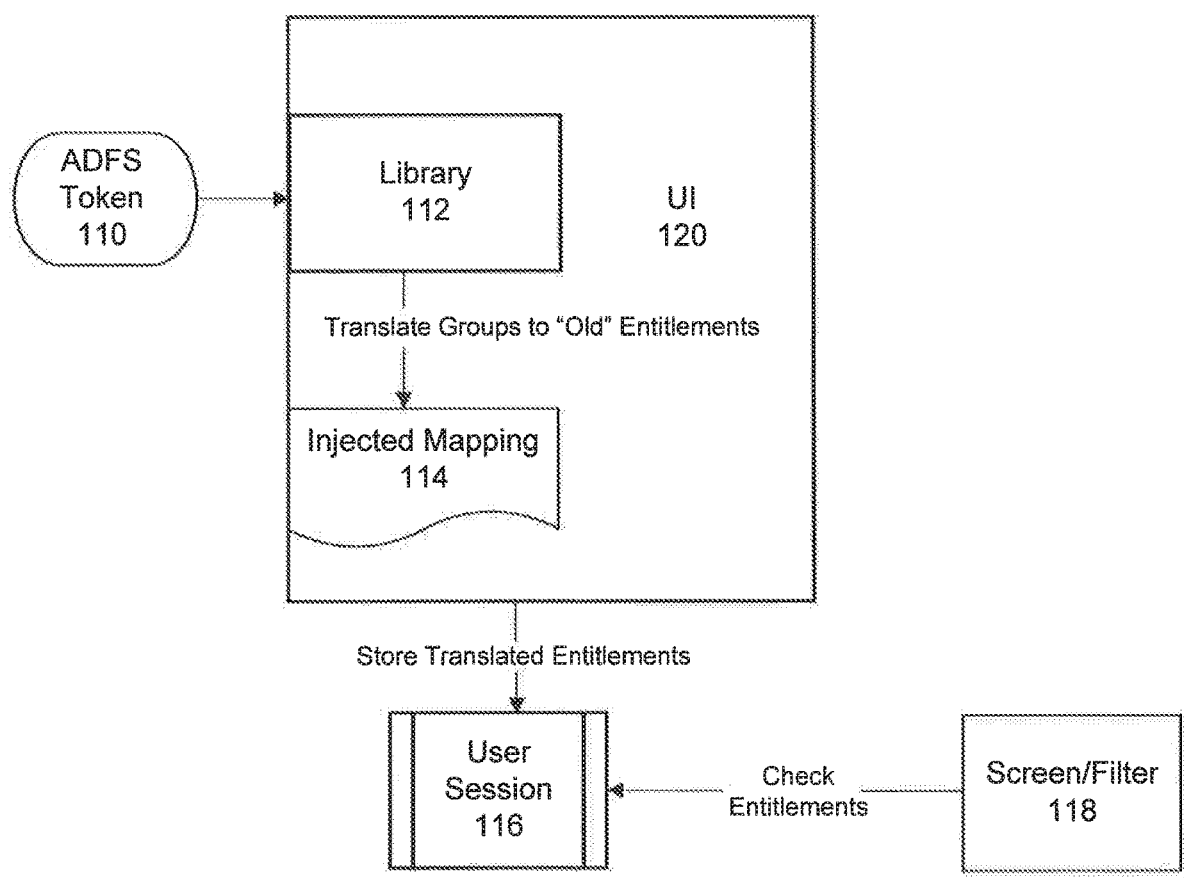
FIG. 1 illustrates a system that translates custom entitlements, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Business teams have spent many hours conceptually defining access for various applications. An embodiment of the present invention is directed to implementing a design pattern that ensures this work does not need to be redone. Each requestable access entity may be aligned to a single Active Directory group.

With custom entitlements, an application may access a table of users, a table of entitlements and a cross reference table that links the tables. When a user logs in, the application may retrieve a standard identifier, look up the user using the standard identifier and then retrieve corresponding entitlements. The entitlements may be stored in a user session so that the application may reference a session object to determine what access is associated with the user.

Currently, many of the custom entitlement applications store users along with a mapping of that user to one or many entitlements. In such systems, when a user logs in, the application makes a call to its database to retrieve the associated entitlements, likely storing them in the session for performance reasons. Through a variety of possible implementations, what the user is allowed to see from there on is determined based on the entitlements listed in the session variable.

An embodiment of the present invention may be directed to an Accelerator component that eliminates the need for each application team to understand the details of how their application integrates with a corporate ADFS source. It may work as a filter that enables applications with older architectures to "plug and play" the communication layer with the central service. For example, the application may utilize an Accelerator component, such as a plug-and-play communication layer with the Active Directory Federation Services (ADFS). The plug-and-play communication layer may provide security modeling, details of parameters and communication with a central ADFS server. In addition, the plug-and-play communication may represent a filter (e.g., Java filter, etc.) that may be applied to an entire application. The Accelerator (communication layer) minimizes configuration and additional coding so that each application is not required to learn detailed security nuances.

An embodiment of the present invention is directed to a translation layer that intercepts a token and converts new group names into old entitlement verbiage based on data loaded at start-up (e.g., hash map, etc.) from a configuration file. The old entitlement verbiage may be loaded into the User Session just as it would have been if the entitlements had come from within the old application authorization structure. The remainder of the application is unaware that the authorization source has changed.

FIG. 1 illustrates a system that translates custom entitlements, according to an embodiment of the present invention. An embodiment of the present invention is directed to a translation layer (represented by Library 112) that intercepts token 110 and converts the associated AD groups into the "language" the application already knows. In this example, token 110 may represent an ADFS token, which may control access, permissions, roles, etc. An embodiment of the present invention relies on injected mappings 114 between the new group names and what role and/or entitlements that correspond to in the old language of access. An embodiment of the present invention is directed to making the mapping of old to new configurable and re-usable across multiple applications instead of hardcoded directly into each application interface. FIG. 1 may support a human user interacting with a UI 120. According to another embodiment, UI 120 may interact with a functional non-human application authorizations as well.

An embodiment of the present invention is directed to ADFS as one exemplary application. Other single sign-on services and claims based access control authentication may be implemented in accordance with the various embodiments of the present invention. For example, an embodiment of the present invention may be extended to Lightweight Directory Access Protocol (LDAP) groups that facilitate the use of an LDAP server to store Unix users and groups. An embodiment of the present invention may be further extended to support session management, maintaining session privileges or session attributes. An embodiment of the present invention may be applied to various types of conversions and translations. The system may be applied to various applications that perform a translation from one entitlement system to another. For example, an embodiment of the present invention may be used for an application that converts custom entitlements to LDAP, LDAP to ADFS or any other entitlement system.

Figure 2:
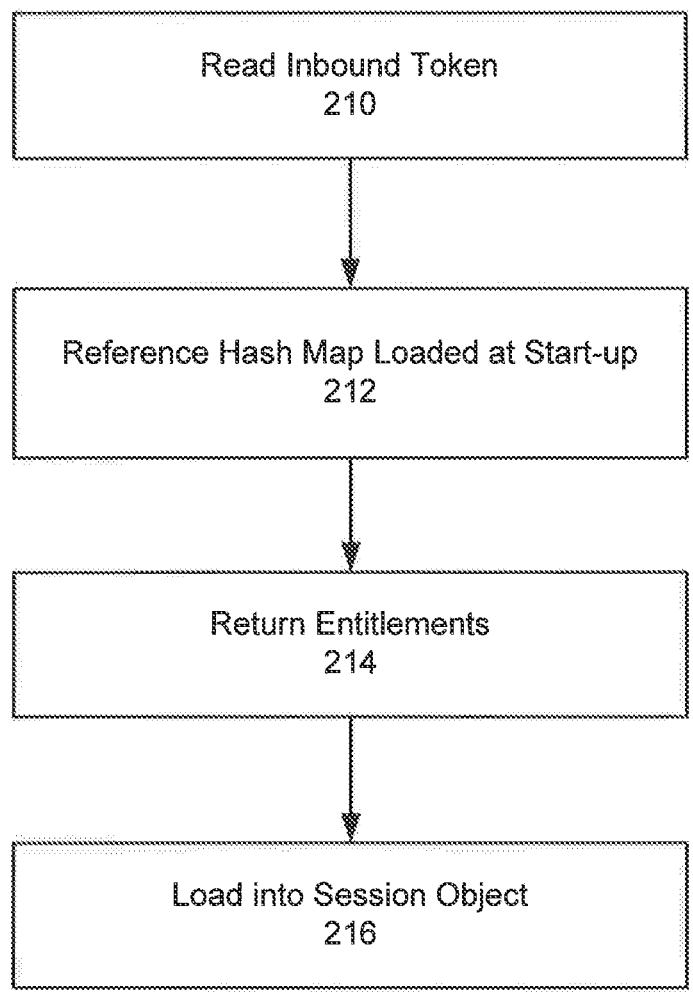
FIG. 2 illustrates an exemplary flow chart of translating custom entitlements, according to an embodiment of the present invention.

FIG. 2 illustrates an exemplary flow chart of translating custom entitlements, according to an embodiment of the present invention. At step 210, a translation layer may receive and read an inbound token.

An exemplary configuration may include:
MYAPP_ADMIN_STUFF=Administrator,User
MYAPP_READ_ONLY=Read
MYAPP_EDIT=User According to the exemplary configuration, an embodiment of the present invention may read an inbound token with the group "MYAPP_ADMIN_STUFF" in it. At step 212, an embodiment of the present invention may reference the HashMap that was loaded at startup of the application for instances of that group name. At step 214, the system may return entitlements. According to the exemplary configuration, this may involve returning "Administrator" and "User" to the main process to be loaded into the session object. At step 216, the system may load the entitlements into a session object. The rest of application will now immediately know what is needed without additional changes or knowledge that those entitlements did not come from the database. This not only prevents every application from having to learn Active Directory and ADFS tokens, but also lessens the opportunity for failure through missed screens, data flows, etc. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
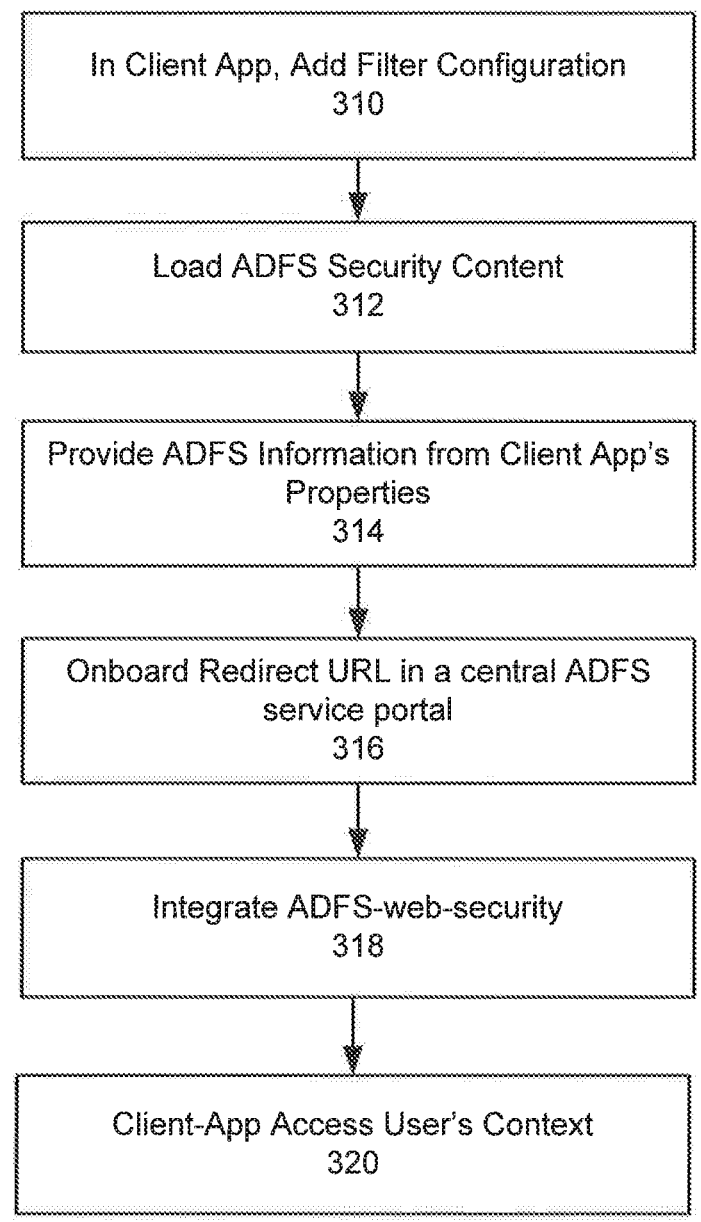
FIG. 3 is an exemplary set of integration steps, according to an embodiment of the present invention.

FIG. 3 is an exemplary set of integration steps, according to an embodiment of the present invention. At step 310, a filter configuration may be added in a client application. In the client application's web.xml may add filter configuration, so that the control will redirect to a central ADFS service for authentication. At step 312. ADFS security content may be loaded. At step 314, ADFS related information from the client application's properties may be provided. At step 316, a redirect URL may be registered in a central ADFS service portal so that ADFS may redirect to the application. At step 318, ADFS-web-security may be integrated so that client application may provide Profile to Role mapping. ADFS-web-security may further convert the profiles to roles and maintain them in security context. At step 320, client-app may access user's context. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a translation layer that converts source groups into custom entitlements known by the application, the system comprising:
a computer processor configured to perform the steps of:
reading, via the computer processor, an inbound single sign-on token wherein the single sign-on token references one or more groups; and
translating, via a library component of the computer processor, the one or more groups to a corresponding entitlement based on injected mappings loaded at start-up;
storing, via the library component, the corresponding entitlements in a User Session; and
enabling, via the library component, the application to access the corresponding entitlements;
wherein the library component and the injected mappings are supported by a user interface that executes the application, and further wherein the library component uses a group name to return a corresponding entitlement to a main process to be loaded into a session object.

2. The system of claim 1, wherein the single sign-on token comprises Active Directory Federation Services (ADFS) token and the one or more groups comprise Active Directory (AD) groups.

3. The system of claim 1, further comprising a plug and play communication layer that enables the application to communicate with a central service.

4. The system of claim 3, wherein the plug and play communication layer comprises a Java filter.

5. The system of claim 1, wherein the corresponding entitlements comprise roles.

6. The system of claim 1, wherein the corresponding entitlements comprise access permissions.

7. The system of claim 1, wherein the library component supports session management.

8. The system of claim 1, wherein the library component maintains session privileges.

9. The system of claim 1, wherein the library component maintains session attributes.

10. A method that implements a translation layer that converts source groups into custom entitlements known by the application, the method comprising the steps of:
    receiving, via an input, an inbound single sign-on token wherein the single sign-on token references one or more groups;
    translating, via a library component, the one or more groups to a corresponding entitlement based on injected mappings loaded at start-up;
    storing the corresponding entitlements in a User Session; and
    enabling the application to access the corresponding entitlements;
    wherein the library component and the injected mappings are supported by a user interface that executes the application, and further wherein the library component uses a group name to return a corresponding entitlement to a main process to be loaded into a session object.

11. The method of claim 10, wherein the single sign-on token comprises Active Directory Federation Services (ADFS) token and the one or more groups comprise Active Directory (AD) groups.

12. The method of claim 10, further comprising the step of:
    implementing a plug and play communication layer that enables the application to communicate with a central service.

13. The method of claim 12, wherein the plug and play communication layer comprises a Java filter.

14. The method of claim 10, wherein the corresponding entitlements comprise roles.

15. The method of claim 10, wherein the corresponding entitlements comprise access permissions.

16. The method of claim 10, wherein the library component supports session management.

17. The method of claim 10, wherein the library component maintains session privileges.

18. The method of claim 10, wherein the library component maintains session attributes.

* * * * *